(12) United States Patent
Naughton, III

(10) Patent No.: US 9,828,139 B2
(45) Date of Patent: Nov. 28, 2017

(54) DUST SEQUESTERING ASSEMBLY

(71) Applicant: John Naughton, III, Lombard, IL (US)

(72) Inventor: John Naughton, III, Lombard, IL (US)

( * ) Notice: Subject to any disclaimer, the term of this patent is extended or adjusted under 35 U.S.C. 154(b) by 0 days.

(21) Appl. No.: 15/014,553

(22) Filed: Feb. 3, 2016

(65) Prior Publication Data

US 2017/0217636 A1  Aug. 3, 2017

(51) Int. Cl.
*B07B 1/06* (2006.01)
*B65D 25/04* (2006.01)
*B65D 43/02* (2006.01)
*A47J 47/02* (2006.01)
*B07B 1/02* (2006.01)

(52) U.S. Cl.
CPC ............. *B65D 25/04* (2013.01); *A47J 47/02* (2013.01); *B07B 1/06* (2013.01); *B65D 43/02* (2013.01); *B07B 1/02* (2013.01)

(58) Field of Classification Search
CPC . B07B 1/02; B07B 1/06; B07B 1/4609; A47J 43/22; B65D 25/04
See application file for complete search history.

(56) References Cited

U.S. PATENT DOCUMENTS

| 1,482,873 | A | * | 2/1924 | Ullrich | A47J 43/22 209/251 |
| 1,542,430 | A | * | 6/1925 | Wever | B65D 83/06 209/236 |
| 1,610,300 | A | * | 12/1926 | Lovejoy | A47J 43/22 209/251 |
| 1,878,924 | A | * | 9/1932 | Will | A45D 33/003 220/568 |
| D247,211 | S | | 2/1978 | Young | |
| 4,307,808 | A | * | 12/1981 | Johnson | A47J 43/22 131/311 |
| 5,417,906 | A | | 5/1995 | Chiodo | |
| 7,766,168 | B2 | * | 8/2010 | Thrapp | A45F 5/021 206/315.11 |
| 9,226,619 | B2 | * | 1/2016 | Constantino, Jr. | A47J 43/22 |
| 9,364,118 | B2 | * | 6/2016 | Henry | A47J 43/22 |
| 2008/0302718 | A1 | | 12/2008 | Hardy | |
| 2012/0321748 | A1 | | 12/2012 | Otto et al. | |
| 2012/0328739 | A1 | | 12/2012 | Nocera | |
| 2013/0015120 | A1 | | 1/2013 | Luer | |
| 2013/0196032 | A1 | | 8/2013 | Ford et al. | |
| 2015/0305568 | A1 | * | 10/2015 | Edri | A47J 43/22 222/1 |

FOREIGN PATENT DOCUMENTS

WO  WO2015039251  3/2015

* cited by examiner

*Primary Examiner* — Joseph C Rodriguez

(57) ABSTRACT

A dust sequestering assembly for sequestering dust from a particulate food item includes a container that may contain a particulate food item. A sieve is positioned within the container and the sieve may have dust pass therethrough. Thus, the dust is sequestered with respect to the particulate food item.

2 Claims, 4 Drawing Sheets

DUST SEQUESTERING ASSEMBLY

BACKGROUND OF THE DISCLOSURE

Field of the Disclosure

The disclosure relates to dust sequestering devices and more particularly pertains to a new dust sequestering device for sequestering dust from a particulate food item.

SUMMARY OF THE DISCLOSURE

An embodiment of the disclosure meets the needs presented above by generally comprising a container that may contain a particulate food item. A sieve is positioned within the container and the sieve may have dust pass therethrough. Thus, the dust is sequestered with respect to the particulate food item.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
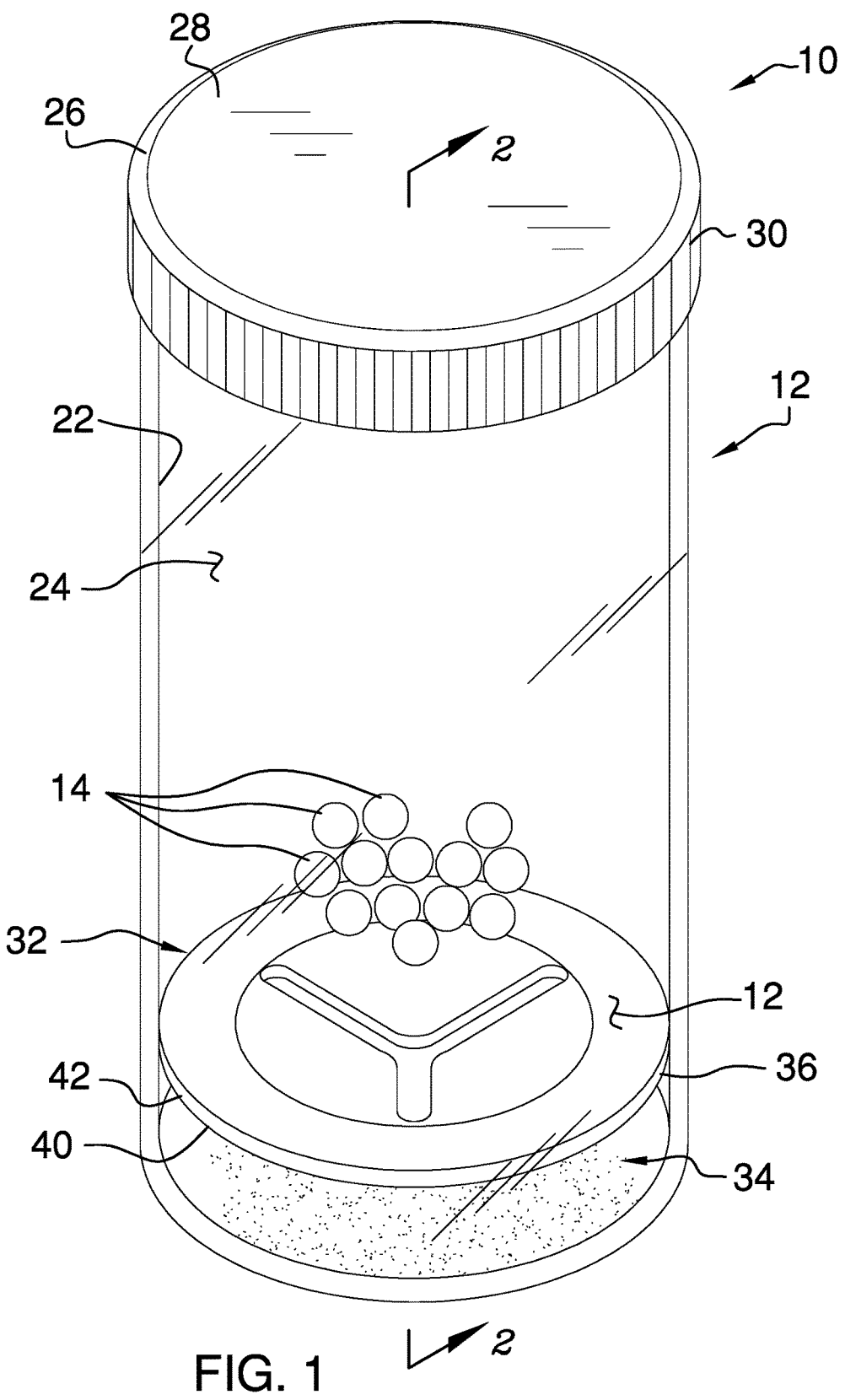
FIG. 1 is a front perspective view of a dust sequestering assembly according to an embodiment of the disclosure.
Figure 2:
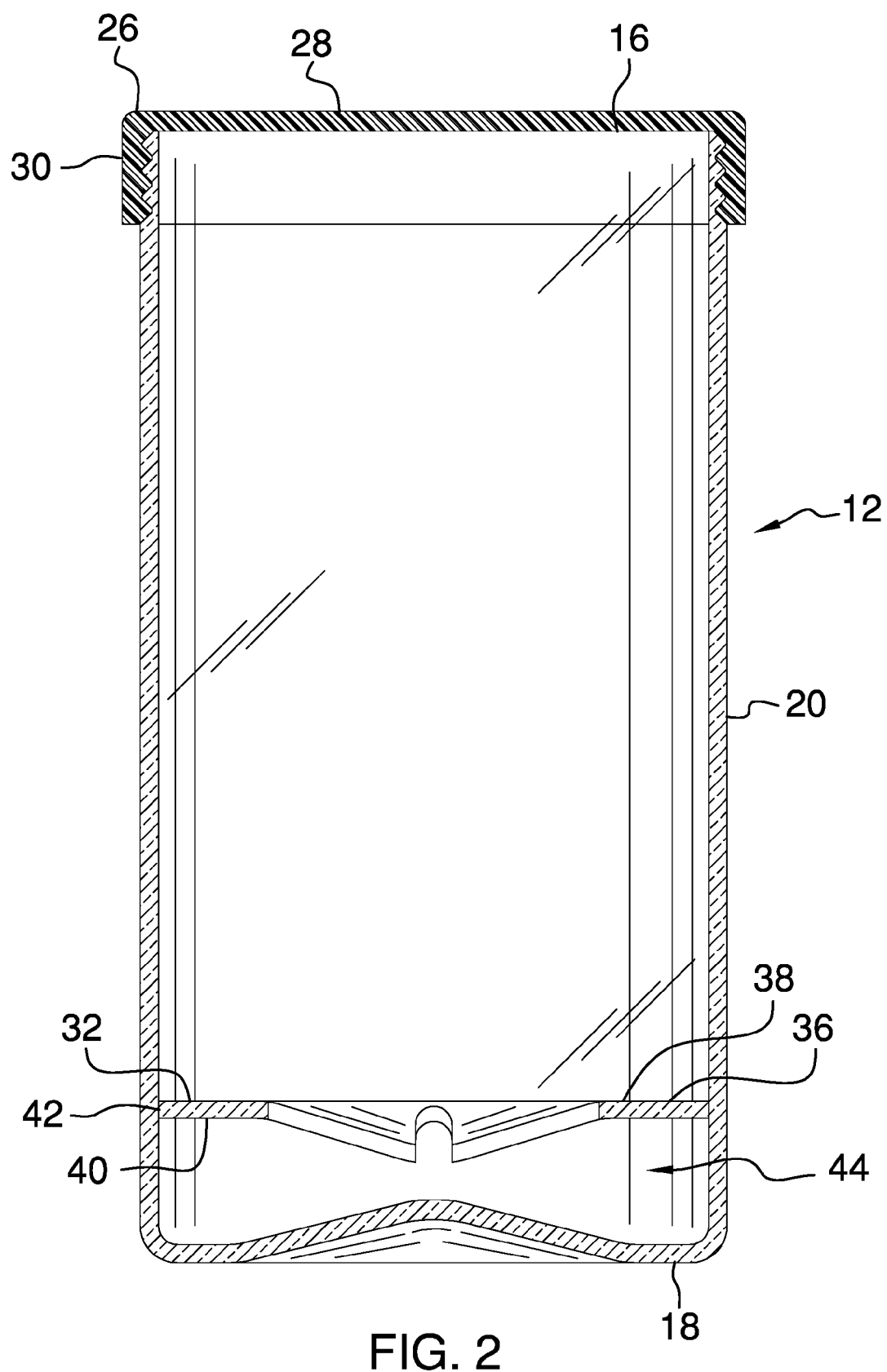
FIG. 2 is a cross sectional view taken along line 2-2 of FIG. 1 of an embodiment of the disclosure.
Figure 3:
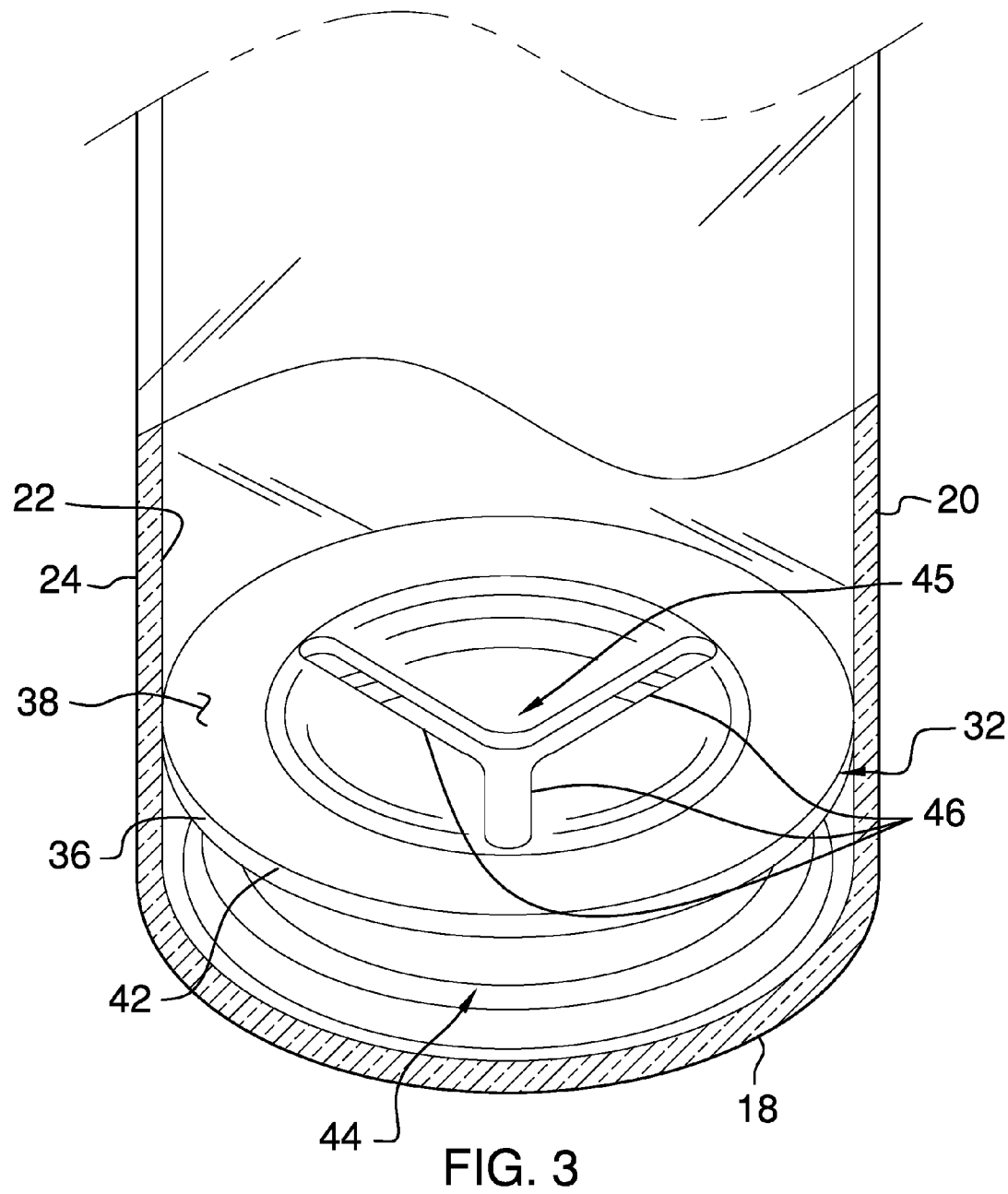
FIG. 3 is a perspective cut-away view of an embodiment of the disclosure.
Figure 4:
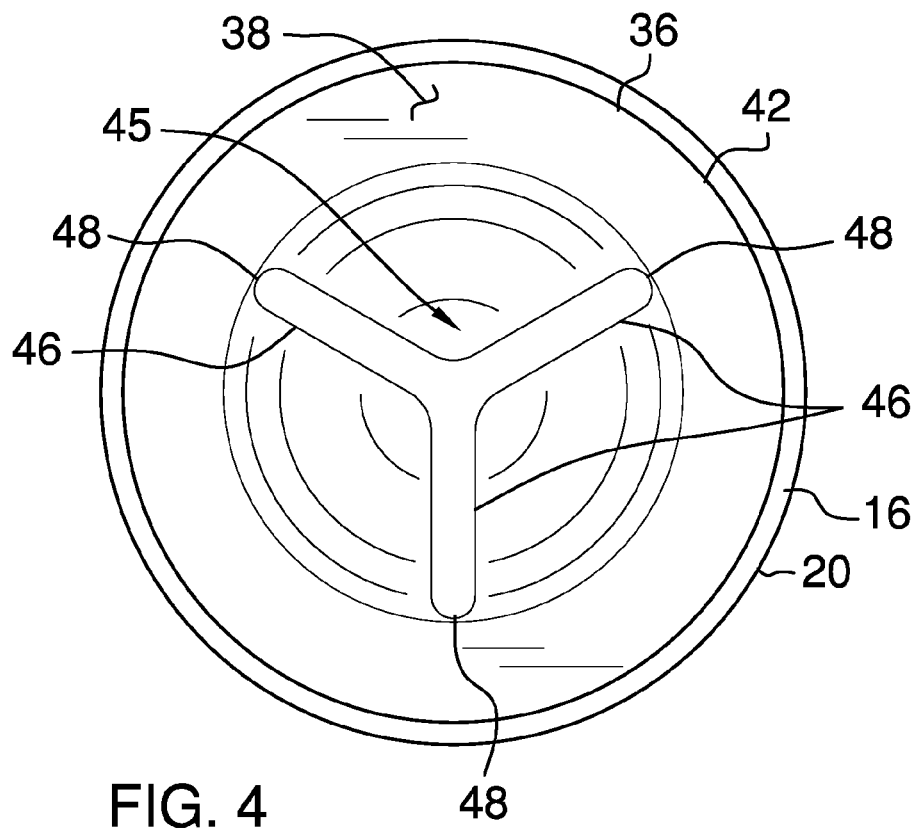
FIG. 4 is a top view of an embodiment of the disclosure.
Figure 5:
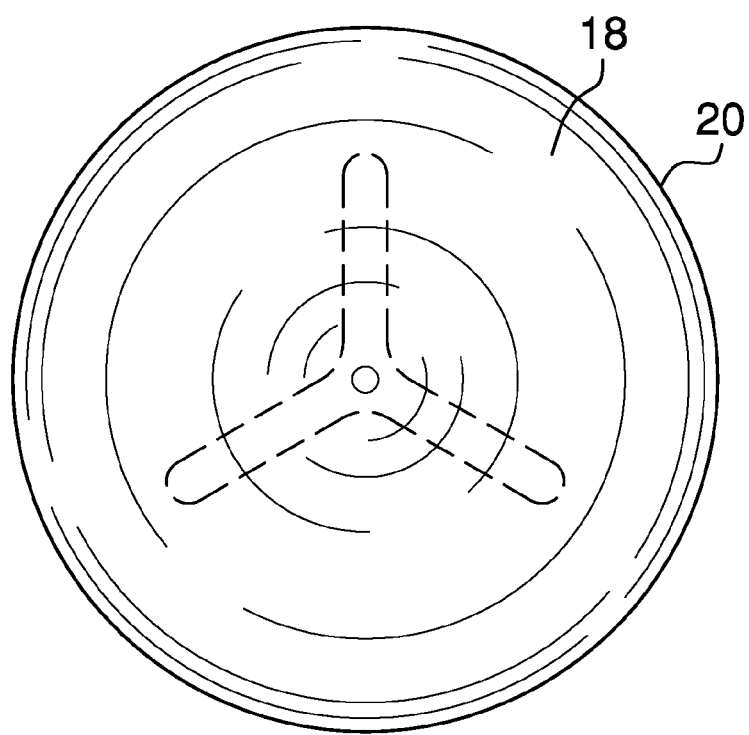
FIG. 5 is a bottom view of an embodiment of the disclosure.

With reference now to the drawings, and in particular to FIGS. 1 through 5 thereof, a new dust sequestering device embodying the principles and concepts of an embodiment of the disclosure and generally designated by the reference numeral 10 will be described.

As best illustrated in FIGS. 1 through 5, the dust sequestering assembly 10 generally comprises a container 12 that may contain particulate food items 14. The container 12 has a top end 16, a bottom end 18 and an outer wall 20 extending between the top end 16 and the bottom end 18. The top end 16 is open and the container 12 is substantially hollow. The outer wall 20 has an inner surface 22 and an outer surface 24. The particulate food items 14 may comprise nuts, cereal and other particulate food items.

The outer surface 24 of the container 12 is threaded adjacent to the top end 16. A lid 26 is provided and the lid 26 is removably coupled to the container 12. The lid 26 has a top wall 28 and a peripheral wall 30 extending downwardly from the top wall 28. The lid 26 is positioned on the top end 16 and the peripheral wall 30 threadably engages the outer surface 24. Thus, the lid 26 retains the particulate food items 14 within the container 12.

A sieve 32 is positioned within the container 12 and the sieve 32 may have dust 34 pass therethrough. Thus, the dust 34 is sequestered with respect to the particulate food items 14. The sieve 32 comprises a disk 36 that has a top surface 38, a bottom surface 40 and a peripheral edge 42 extending between the top surface 38 and the bottom surface 40. The peripheral edge 42 is coupled to the inner surface 22 of the container 12.

The disk 36 is spaced from the bottom end 18 of the container 12 to define a dust space 44 between the bottom end 18 and the disk 36. Each of the top surface 38 and the bottom surface 40 is concavely arcuate with respect to the top end 16 of the container 12. Thus, the disk 36 may direct the particulate food items 14 toward a center 45 of the disk 36. The sieve 32 has a plurality of slots 46 extending through the top surface 38 and the bottom surface 40. Each of the slots 46 has a width that is greater than the dust 34 and less than the particulate food items 14.

Each of the slots 46 radiates outwardly from the center 45 of the disk 36 toward the peripheral edge 42. Each of the slots 46 may have the dust 34 associated with the particulate food items 14 pass into the dust space 44. The dust space 44 sequesters the dust 34 with respect to the particulate food items 14. Thus, the particulate food items 14 may be consumed separately from the dust 34. The bottom end 18 of the container 12 is convexly arcuate with respect to the top end 16 of the container 12. Thus, the dust 34 is urged toward the outer wall 20 of the container 12 when the dust 34 is collected in the dust space 44.

Each of the slots 46 has a distal end 48 with respect to the center 45 of the disk 36. The distal end 48 corresponding to each of the slots 46 is spaced from the peripheral edge 42. The dust 34 collects between the distal end 48 corresponding to each of the slots 46 and the peripheral edge 42 when the container 12 is tilted. Thus, the disk 36 inhibits the dust 34 from exiting the dust space 44 when the container 12 is tilted to dispense the particulate food items 14.

In use, the particulate food items 14 are poured into the container 12 for storage. The dust 34 passes through the slots 46 and the particulate food items 14 are inhibited from passing through the slots 46. Thus, the dust 34 is collected in the dust space 44. The container 12 is tilted to dispense the particulate food items 14. The disk 36 inhibits the dust 34 from exiting the dust space 44 when the container 12 is tilted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dust sequestering assembly comprising:
a container being configured to contain a particulate food item, said container having a top end, a bottom end and an outer wall extending between said top end and said bottom end, said top end being open, said container being substantially hollow, said bottom end being convexly arcuate with respect to said top end, said outer wall having an inner surface; and
a sieve being positioned within said container wherein said sieve is configured to have dust pass therethrough thereby facilitating the dust to be sequestered with respect to the particulate food item, said sieve comprising a disk having a top surface, a bottom surface and a peripheral edge extending between said top surface and said bottom surface, said peripheral edge being coupled to said inner surface of said container, said disk being spaced from said bottom end of said container to define a dust space between said bottom end and said disk, each of said top surface and said bottom surface being concavely arcuate with respect to said top end of said container wherein said disk is configured to direct the particulate food items toward a center of said disk, said disk having a plurality of slots extending through said top surface and said bottom surface, each of said slots radiating outwardly from a center of said disk toward said peripheral edge, each of said slots being configured to have dust associated with the particulate food item pass therethrough, said dust space being configured to sequester the dust with respect to the particulate food items thereby facilitating the particulate food items to be consumed separately from the dust.

2. A dust sequestering assembly comprising:
a container being configured to contain a particulate food item, said container having a top end, a bottom end and an outer wall extending between said top end and said bottom end, said top end being open, said container being substantially hollow, said bottom end being convexly arcuate with respect to said top end, said outer wall having an inner surface;
a lid being removably coupled to said container wherein said lid is configured to retain the particulate food item within said container, said lid being positioned on said top end; and
a sieve being positioned within said container wherein said sieve is configured to have dust pass therethrough thereby facilitating the dust to be sequestered with respect to the particulate food item, said sieve comprising a disk having a top surface, a bottom surface and a peripheral edge extending between said top surface and said bottom surface, said peripheral edge being coupled to said inner surface of said container, said disk being spaced from said bottom end of said container to define a dust space between said bottom end and said disk, each of said top surface and said bottom surface being concavely arcuate with respect to said top end of said container wherein said disk is configured to direct the particulate food items toward a center of said disk, said disk having a plurality of slots extending through said top surface and said bottom surface, each of said slots radiating outwardly from a center of said disk toward said peripheral edge, each of said slots being configured to have dust associated with the particulate food item pass therethrough, said dust space being configured to sequester the dust with respect to the particulate food items thereby facilitating the particulate food items to be consumed separately from the dust, each of said slots having a distal end with respect to said center of said disk, said distal end corresponding to each of said slots being spaced from said peripheral edge wherein said disk is configured to inhibit the dust from exiting said dust space when said container is tilted to dispense the particulate food items.

* * * * *